United States Patent [19]

Hollstein

[11] 3,884,936

[45] May 20, 1975

[54] PREPARATION OF 2-PYRROLIDONE
[75] Inventor: Elmer J. Hollstein, Wilmington, Del.
[73] Assignee: Sun Research and Development Company, Marcus Hook, Pa.
[22] Filed: Apr. 23, 1973
[21] Appl. No.: 353,277

Related U.S. Application Data
[63] Continuation-in-part of Ser. No. 108,376, Jan. 21, 1971, abandoned.

[52] U.S. Cl. .................................. 260/326.5 FN
[51] Int. Cl. ............................................ C07d 27/08
[58] Field of Search .......................... 260/326.5 FN

[56] References Cited
UNITED STATES PATENTS
3,198,808  8/1965  Himmele et al. ................ 260/326.5
3,448,118  6/1969  Chichery et al. ................ 260/326.5

Primary Examiner—Joseph A. Narcavage
Attorney, Agent, or Firm—George L. Church; Donald R. Johnson; Paul Lipsitz

[57] ABSTRACT

A process for preparing 2-pyrrolidone which comprises reacting maleic acid or maleic anhydride with hydrogen and ammonia in an aqueous system at a mole ratio of ammonia to acid or anhydride of from 1.0:1 to 1.2:1, at a temperature of from about 200° to about 300°C, at a pressure of from about 1,000 to about 3,000 psig, for a time of about 0.5 to about 8 hours, and in the presence of a catalyst of palladium supported on carbon.

3 Claims, 1 Drawing Figure

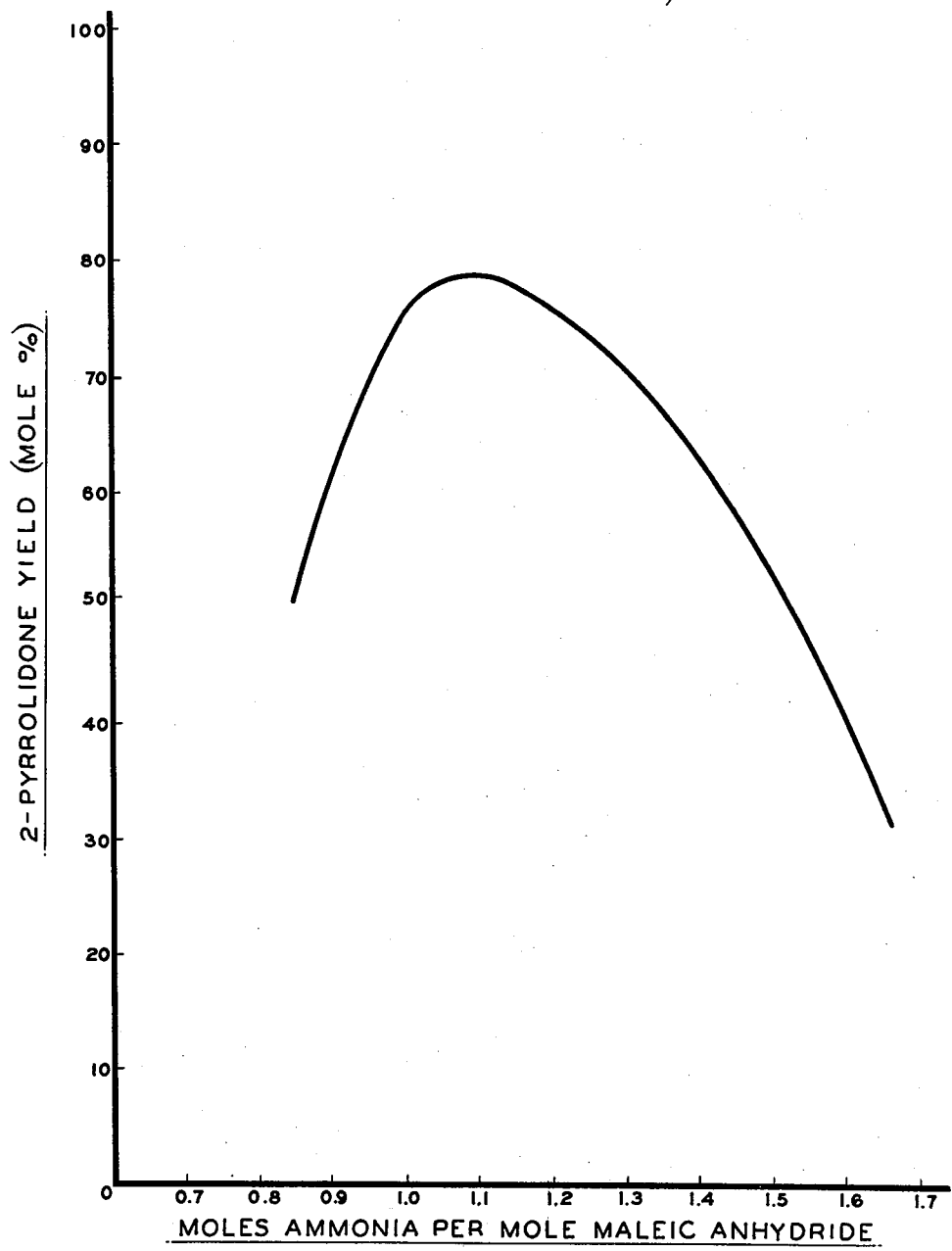

PREPARATION OF 2-PYRROLIDONE

RELATED APPLICATION

This application is a continuation-in-part of Ser. No. 108,376, filed Jan. 21, 1971 and now abandoned.

The conversion of anhydrides such as maleic anhydride and succinic anhydride to 2-pyrrolidone is known in the art. For example, U.S. Pat. No. 3,080,377 (Liao, assigned to FMC Corp., issued Mar.. 5, 1963) discloses that succinic anhydride may be converted to 2-pyrrolidone by reaction for 1 to 8 hours with ammonia (1 to 20 moles per mole of anhydride, preferably 2 to 5 moles of liquid ammonia) and at least one mole of hydrogen at 200°–300°C, at 500 to 5,000 psig, and in the presence of catalysts such as cobalt, nickel, ruthenium, and palladium. Yields of 2-pyrrolidone product are on the order of 30% (with palladium catalyst) to 70% of theory (with Raney cobalt).

U.S. Pat. No. 3,198,808 (Himmele et al, assigned to BASF, issued Aug. 3, 1965) discloses preparation of 2-pyrrolidone from maleic acid and ammonia using a specially prepared sintered oxide catalyst whereby excellent yields are obtained.

U.S. Pat. No. 3,109,005 (Lidov, assigned to Halcon International, Inc., issued Oct. 29, 1963) discloses preparation of 2-pyrrolidone and its N-substituted derivatives from maleic anhydride in a solvent system by reaction of hydrogen and 5 moles of ammonia or suitable amine per mole of anhydride at 150° to 350°C, for 10 to 12 hours at 100 to 300 atmospheres and in the presence of a hydrogenation catalyst such as Raney nickel, Raney cobalt, or palladium or platinum on a support. Yields of product are given as about 65% to 76% of theory.

U.S. Pat. No. 3,448,118 (Chickery, assigned to Rhone-Poulenc S.A., issued June 3, 1969) discloses that succinic acid will react with primary amines in various solvent systems (e.g., dioxane, water, tetrahydrofurane, etc.) and in the presence of various catalysts to form N-alkyl-substituted pyrrolidones. Where palladium on charcoal is used as the catalyst in a dioxane system, the yield of product is low, being 65.5%.

In investigating the process of making 2-pyrrolidone in an aqueous system it has been found that yields are generally poor being less than about 60% of theory. Furthermore, although many catalysts and catalyst supports are suggested for the process, the reaction appears to be highly sensitive to both catalyst metal and its support. It has now been discovered that in the conversion of maleic acid and maleic anhydride to 2-pyrrolidone in an aqueous system, surprisingly high yields can be obtained by following the process of this invention.

In accord with the invention, 2-pyrrolidone is prepared in high yield by reacting maleic acid or its anhydride with hydrogen and ammonia in an aqueous system at a mole ratio of ammonia to acid or anhydride of from 1.0:1 to 1.2:1, at a temperature of from about 200° to about 300°C, at a pressure of from about 1,000 to about 3,000 psig, for a time of about 0.5 to about 8 hours, and in the presence of a catalyst of palladium supported on carbon.

The amount of ammonia used in the reaction is critical to achieve the high yields capable of the process. This is clearly shown by the figure which shows that maximum yield occurs when 1.1 ± 0.1 moles of ammonia are used per mole of maleic acid or anhydride and that rapid yield fall-off occurs when deviating from this ratio.

The process of the invention is also clearly dependent upon the use of a palladium on carbon catalyst, which may contain from about 1% to 10% (preferably 5%) by weight palladium in the total catalyst-support composition. The amount of catalyst used in the process may vary from about 1% to about 10% by weight of the maleic acid or maleic anhydride, and will preferably be used at 5% by weight. Experiments have shown that the process of converting maleic anhydride to 2-pyrrolidone prooceeds quite differently with othr catalysts. For example, when using palladium on alumina instead of palladium on carbon, the yield of 2-pyrrolidone is on the order of 40 to 50% and no peak of yield is found at mole ratios of ammonia to maleic anhydride ranging from 0.90 to 1.3.

The process of the invention is carried out over a temperature range of between about 200° and 300°C, but preferred temperature will be between about 250° to 290°C, and most preferred about 275°C. Reaction pressure will vary between about 1,000 and 3,000 psig, with a pressure of about 1,700 psig being preferred. Time of reaction may vary from about 0.5 to about 8 hours, with a preferred reaction time of from about 1.5 to about 2.5 hours, most preferred being about 2 hours. If reaction time is maintained for too long, a decrease in yield is experienced, due, it is believed, to production of unwanted by-products resulting from reactions that the 2-pyrrolidone may enter into.

In order to illustrate the invention the following examples are given:

EXAMPLE 1

A series of reactions is carried out in a rocking 300 ml capacity autoclave which is charged with 49 g of maleic anhydride, 2.5 g of catalyst of 5% by weight palladium on carbon, 100 ml of water, and varying amounts of 28% aqueous ammonium hydroxide. The autoclave is closed and charged with hydrogen to 1,600 psig pressure and is then heated to 275°C at which point a pressure of 1,700 psig is maintained. After holding a temperature for 2 hours the reaction mass is cooled, the contents removed and are analyzed. The data obtained is shown in the following table:

| Moles of Ammonia Per Mole of Maleic Anhydride | Yield (Mole %) of 2-Pyrrolidone |
| --- | --- |
| 0.87 | 55.0 |
| 0.99 | 75.0 |
| 1.09 | 78.4 |
| 1.19 | 75.2 |
| 1.64 | 34.3 |

EXAMPLE 2

When maleic acid replaces the anhydride in the above example, the same criticality of the ammonia mole ratio is evidenced.

The invention claimed is:

1. A process for preparing 2-pyrrolidone which comprises reacting maleic acid or maleic ahydride with hydrogen and ammonia in an aqueous system at a mole ratio of ammonia to acid or anhydride of from 1.0:1 to 1.2:1 at a temperature from about 200° to about 300°C, at a pressure from about 1,000 to about 3,000 psig for a time of about 0.5 to about 8 hours, and in the presence of from about 1% to about 10% by weight of said acid or anhydride of a catalyst of palladium supported on carbon.

2. The process of claim 1 where the temperature is about 275°C, pressure is about 1,700 psig and reaction time is about 2 hours.

3. The process of claim 2 with maleic anhydride.

* * * * *